J. A. WORKMAN, Sr.
SPRING WHEEL.
APPLICATION FILED JAN. 23, 1917.
1,237,988.
Patented Aug. 21, 1917.
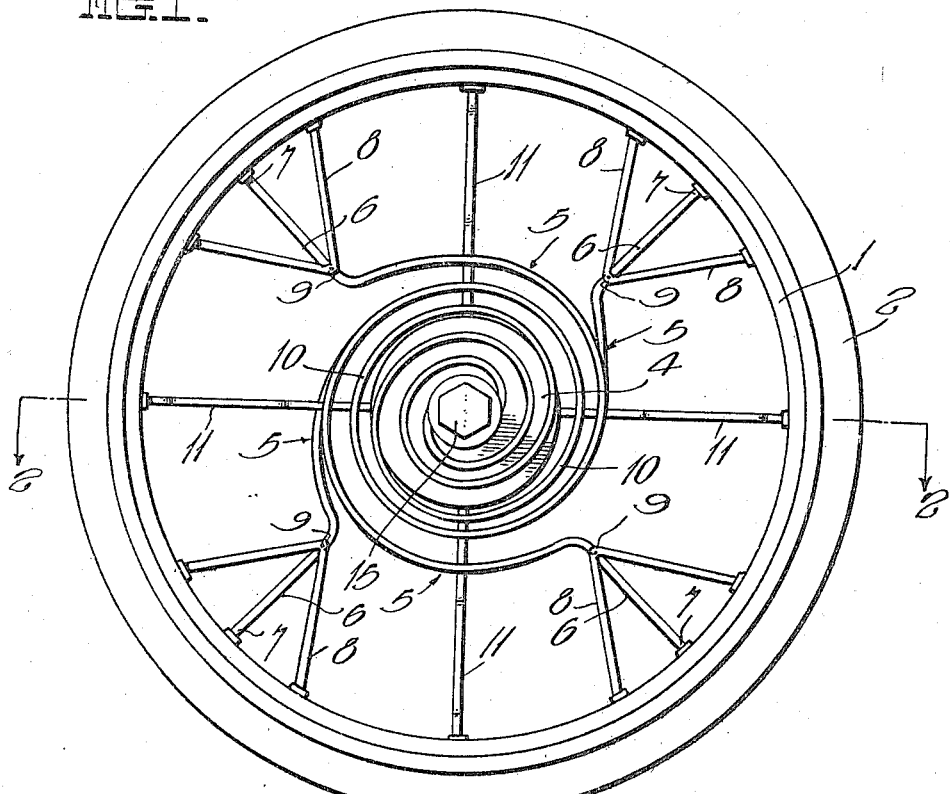
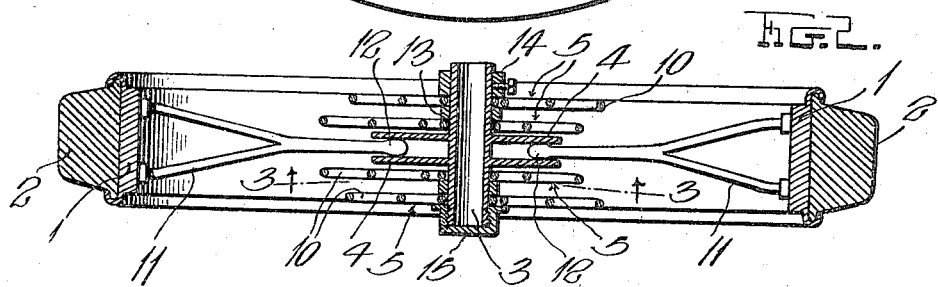
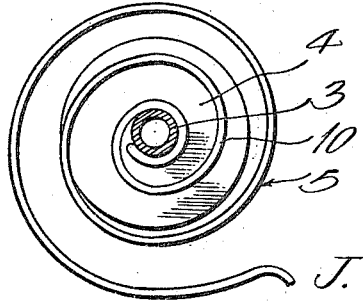
Witness
H. Woodard
Inventor
J. A. Workman, Sr.
By H. B. Wilson &co.
Attorneys

UNITED STATES PATENT OFFICE.

JAMES ALEXANDER WORKMAN, SR., OF PORTAGEVILLE, MISSOURI.

SPRING-WHEEL.

1,237,988. Specification of Letters Patent. Patented Aug. 21, 1917.

Application filed January 23, 1917. Serial No. 143,949.

*To all whom it may concern:*

Be it known that I, JAMES ALEXANDER WORKMAN, Sr., citizen of the United States, residing at Portageville, in the county of New Madrid and State of Missouri, have invented certain new and useful Improvements in Spring-Wheels; and I do declare the following to be a full, clear, and exact description of the invention, such as will enable others skilled in the art to which it appertains to make and use the same.

This invention relates to new and useful improvements in spring wheels, and the primary object of the invention is to provide a new and improved type of spring wheel which is adapted to take up the shocks and jars incident to the travel of the wheel, thereby increasing the life of the same and avoiding the necessity of the use of pneumatic tires, and the like.

Another object of the invention is to provide a spring wheel of this character which in addition to the resilient construction, is provided with means for preventing any lateral movement of the wheel, thereby greatly strengthening the same.

Another object of this invention is to provide a device of this character which is simple and durable in construction, inexpensive to manufacture, and one which will be very efficient in operation.

With these and numerous other objects in view, my invention consists of the novel features of construction, combination and arrangement of parts which will be herein referred to and more particularly pointed out in the specification and claims.

In the accompanying drawings:

Figure 1 is a side elevation of the vehicle wheel;

Fig. 2 is a section on the line 2—2 of Fig. 1; and

Fig. 3 is a detail view of one of the springs showing the same wrapped around the axle.

In describing my invention I shall refer to the drawings in which similar reference characters designate corresponding parts throughout the several views. The numeral 1 designates the rim of the wheel, said rim being adapted to receive on its outer surface a rubber tread 2.

The wheel is provided with a hub portion 3, which is formed of a hollow sleeve, adapted to be placed on the axle of the vehicle, the said hub being of any desired size, such as is best adapted for use on the type of vehicle to which the wheel is applied. The hub 3 is provided on its outer surface with a pair of spaced disks 4, which are centrally disposed thereon for a purpose to be hereinafter more fully described.

The resilient means which connects the rim 2 and hub 3 comprises a plurality of resilient wire spokes 5 which are so arranged and supported that they will take up all shocks and jars incident to the operation of the wheel. These wire spokes are preferably four in number as clearly shown in Figs. 1 and 2 of the drawings, and they are formed with straight portions 6, which have their outer ends 7 secured to the inner surface of the rim 2 in spaced relation. Each pair of these spokes are secured to the rim at diametrically opposite points. The outer ends of the spokes are securely held in position by means of bracing members 8 which are formed of rods bent intermediate their ends as shown at 9 and anchored at this point to the inner ends of the straight portions 6 of said spokes. The opposite ends of the bracing members 8 are secured to the inner surface of the rim on opposite sides of the spoke which they brace. By this construction the ends of the spokes adjacent the rim will be securely held in contact therewith.

The wire spokes 5 are coiled as shown at 10 in one direction, the oppositely disposed pair of spokes being coiled around one end of the hub, while the other pair is coiled around the opposite end. The convolutions 10 of the spokes are approximately one-third of the diameter of the wheel, and the inner ends of said spokes are secured to the hub portion in a manner hereinafter more fully described.

To brace the wheel and prevent undue lateral strain which would be likely to bend the spokes, I have provided radially and inwardly projecting brace or guide rods or members 11 which have their outer ends secured to the inner surface of the rim, one member being provided between each pair of spokes. These members extend radially inwardly and have their inner ends 12 enlarged and adapted to be positioned between the disks 4 on the hub 3. Owing to the fact that these guide members are rigid, they will securely fasten the hub to the rim and will prevent any spring movement of the wheel except in a radial direction.

As has been hereinbefore stated, two of the spokes are coiled around one end of the hub, while the other pair of springs are coiled around the opposite end. To securely hold the inner ends of the spokes in engagement with the hub, I have provided the following manner of securing these ends thereto. On the inner side of the vehicle wheel, the inner end of one of the spokes is secured to the hub adjacent the outside of the disk, and positioned on the hub adjacent its end is a washer 13, while the inner end of the adjacent spoke is coiled around the hub adjacent the other side of this washer. A locking ring 14 which operatively engages the outer surface of the hub is positioned thereon, and tightened up, whereupon the inner ends of the two spokes and the washer will be forced against each other, and against the side of the disk to securely lock the parts into engagement. This same construction is repeated on the outside of the hub, except that in place of the locking ring I have provided a cap member 15 which is secured on the outer end of the hub, and when tightened up will securely lock the parts against the outside of the adjacent disk.

By the above described construction it will be obvious that the spring wheel will be prevented from moving in any other direction than radial, owing to the fact that the brace or guide members will prevent lateral movement of the same. These guide members will rigidly brace the rim and hub, but will not intefere with the necessary radial movement. The straight portions 6 of the spokes 5 are approximately one-fourth of the diameter of the wheel and at their inner ends the spokes are coiled, the diameter of the outer turns being approximately one-third of said diameter of the wheel. All of the coiled portions of the spokes are turned in one direction, around the adjacent ends of the hub, and the inner ends of said spokes are secured to the hub as has been hereinbefore fully described. This construction gives the wheel the requisite amount of resiliency and avoids the necessity of the use of pneumatic tires.

From the foregoing description of the construction and operation of my improved spring wheel, the manner of applying the same to use, and the operation thereof will be readily understood, and it will be seen that I have provided a simple and efficient device of this character for carrying out the objects of the invention.

I claim:

1. In a device of the class described, a rim, a hub and wire spokes connecting said rim and hub; said spokes having non-resilient straight portions at their outer ends and with their inner ends convolutely coiled around and secured to the hub, together with a V-shaped brace member secured at its apex to each spoke at a point within the straight portion thereof and having its free ends attached to the rim.

2. A spring wheel of the class described comprising a rim, a hub, resilient wire spokes having straight portions secured at their outer ends to the rim and projecting radially and inwardly therefrom approximately one-fourth the diameter of the wheel, brace members bent intermediate their ends and anchored to the inner ends of the straight portions, the ends of said braces being secured to said rim, said spokes being coiled around the hub in one direction, the convolutions being spaced and of a diameter approximately one-third the diameter of the wheel, and the inner ends of the spokes secured to said hub.

In testimony whereof I have hereunto set my hand in the presence of two subscribing witnesses.

JAMES ALEXANDER WORKMAN, Sr.

Witnesses:
MATTIE H. COX,
THOMAS W. HILL.

Copies of this patent may be obtained for five cents each, by addressing the "Commissioner of Patents, Washington, D. C."